US012799781B2

(12) United States Patent
Debroucke et al.

(10) Patent No.: US 12,799,781 B2
(45) Date of Patent: Nov. 17, 2026

(54) VEHICLE DOOR LATCH

(71) Applicant: Minebea AccessSolutions France, Alfortville (FR)

(72) Inventors: François Debroucke, Alfortville (FR); Jean-Marc Verbrugghe, Alfortville (FR); Jérémy Paumelle, Alfortville (FR)

(73) Assignee: Minebea AccessSolutions France, Alfortville (FR)

( * ) Notice: Subject to any disclaimer, the term of this patent is extended or adjusted under 35 U.S.C. 154(b) by 0 days.

(21) Appl. No.: 19/297,536

(22) Filed: Aug. 12, 2025

(65) Prior Publication Data

US 2026/0055646 A1 Feb. 26, 2026

(30) Foreign Application Priority Data

Aug. 22, 2024 (EP) .................................... 24315386
Aug. 22, 2024 (EP) .................................... 24315387
Dec. 19, 2024 (EP) .................................... 24315595

(51) Int. Cl.
*E05B 81/90* (2014.01)
*E05B 81/06* (2014.01)
(Continued)

(52) U.S. Cl.
CPC .............. *E05B 81/90* (2013.01); *E05B 81/06* (2013.01); *E05B 81/14* (2013.01); *E05B 81/30* (2013.01); *E05B 81/34* (2013.01); *E05B 81/46* (2013.01)

(58) Field of Classification Search
CPC .......... E05B 81/90; E05B 81/06; E05B 81/04; E05B 81/30; E05B 81/34; E05B 81/46;
(Continued)

(56) References Cited

U.S. PATENT DOCUMENTS 6,003,910 A * 12/1999 Dupont .................. E05B 81/14 292/216
6,254,148 B1 * 7/2001 Cetnar .................... E05B 81/42 292/201
(Continued)

FOREIGN PATENT DOCUMENTS

CN 106246013 B * 2/2020 ............ E05B 81/06
CN 110748251 B * 3/2021 ............ E05B 81/20
(Continued)

OTHER PUBLICATIONS

Extended European Search Report issued Feb. 7, 2025 in European Application No. 24315386 filed on Aug. 22, 2024, 6 pages.
(Continued)

*Primary Examiner* — Steven A Tullia
(74) *Attorney, Agent, or Firm* — Oblon, McClelland, Maier & Neustadt, L.L.P.

(57) ABSTRACT

A vehicle door latch includes a retention unit engaging with a striker in the closed position and releasing the striker to release the vehicle door latch in the open position, an electrical release mechanism, a mechanical release mechanism including an inner release lever to be moved from a rest position to an active position, a locking mechanism including a locking lever, an override mechanism including an override lever to move the locking lever from a locked position to the unlocked position. In a first configuration, the override lever has a first shape wherein the override lever stroke is reached at a first position. In a second configuration, the override lever has a second shape wherein the override lever stroke is reached at a second position. The vehicle door latch can be configured according to the first or to the second configuration by replacing the override lever.

13 Claims, 6 Drawing Sheets

(51) Int. Cl.
*E05B 81/14* (2014.01)
*E05B 81/30* (2014.01)
*E05B 81/34* (2014.01)
*E05B 81/46* (2014.01)

(58) Field of Classification Search
CPC .......... E05B 81/14; E05B 81/16; E05B 81/42; E05B 63/0056; E05B 77/30; E05B 77/00; E05B 77/28; E05B 77/24; E05B 77/265; E05B 77/32; E05B 79/10; E05B 79/12; E05B 79/20; E05B 83/36; E05B 83/18; E05B 85/00; Y10T 292/1079; Y10T 292/1047; Y10T 292/1082; Y10S 292/23
USPC .......................................................... 70/279.1
See application file for complete search history.

(56) References Cited

U.S. PATENT DOCUMENTS

| | | | | |
|---|---|---|---|---|
| 6,364,378 | B1 * | 4/2002 | Humbert | E05B 81/16 292/216 |
| 6,419,286 | B1 * | 7/2002 | Szablewski | E05B 81/14 292/201 |
| 6,883,839 | B2 * | 4/2005 | Belmond | E05B 81/82 292/216 |
| 7,445,256 | B2 | 11/2008 | Gotou et al. | |
| 8,256,805 | B2 * | 9/2012 | Ishiguro | E05B 81/16 292/216 |
| 8,388,030 | B2 * | 3/2013 | Takahashi | E05B 81/16 292/216 |
| 8,522,583 | B2 * | 9/2013 | Cumbo | E05B 81/06 292/201 |
| 8,967,678 | B2 * | 3/2015 | Rosales | E05B 17/22 292/216 |
| 10,316,553 | B2 * | 6/2019 | Krishnan | E05B 81/14 |
| 10,450,780 | B2 * | 10/2019 | Tomaszewski | E05B 81/16 |
| 10,563,436 | B2 * | 2/2020 | Krishnan | E05B 81/14 |
| 10,704,302 | B2 | 7/2020 | Ichinose | |
| 10,844,639 | B2 * | 11/2020 | Nelsen | E05B 81/90 |
| 10,907,384 | B2 * | 2/2021 | Damboiu | E05B 81/42 |
| 10,907,385 | B2 * | 2/2021 | Krishnan | E05B 81/06 |
| 11,035,156 | B2 * | 6/2021 | Damboiu | E05B 81/14 |
| 11,066,853 | B2 * | 7/2021 | Ney | E05B 79/20 |
| 11,085,204 | B2 * | 8/2021 | Ichinose | E05B 77/32 |
| 11,274,478 | B2 * | 3/2022 | Ney | E05B 81/12 |
| 11,280,121 | B2 * | 3/2022 | Sardelli | E05B 15/004 |
| 11,401,739 | B2 * | 8/2022 | Suholutskaja | E05B 77/265 |
| 12,129,690 | B2 * | 10/2024 | Nam | E05B 81/90 |
| 12,146,348 | B2 * | 11/2024 | Philippe | E05B 81/06 |
| 12,188,268 | B2 * | 1/2025 | Sanchez Rojas | E05B 83/36 |
| 12,264,514 | B2 * | 4/2025 | Sanchez Rojas | E05B 81/30 |
| 12,590,474 | B2 * | 3/2026 | Rojas | E05B 81/06 |
| 2011/0107800 | A1 * | 5/2011 | Barbier | E05B 77/28 70/237 |
| 2015/0233157 | A1 | 8/2015 | Bendel | |
| 2016/0017645 | A1 * | 1/2016 | Tomaszewski | E05B 81/90 292/240 |
| 2017/0314297 | A1 * | 11/2017 | Taurasi | E05B 77/30 |
| 2020/0347649 | A1 * | 11/2020 | Nam | E05B 81/34 |
| 2022/0090418 | A1 * | 3/2022 | Graute | E05B 81/46 |
| 2022/0275668 | A1 * | 9/2022 | Escamilla Hernandez | E05B 81/90 |
| 2022/0298835 | A1 * | 9/2022 | Taurasi | E05B 81/24 |
| 2023/0167660 | A1 | 6/2023 | Tomaszewski | |
| 2025/0012120 | A1 * | 1/2025 | Philippe | E05B 81/34 |
| 2025/0116138 | A1 * | 4/2025 | Cetnar | E05B 81/16 |

FOREIGN PATENT DOCUMENTS

| | | | | | |
|---|---|---|---|---|---|
| DE | 100 44 613 | A1 | | 10/2001 | |
| DE | 202013105695 | U1 | * | 3/2015 | E05B 77/26 |
| DE | 20 2014 104 111 | U1 | | 12/2015 | |
| DE | 102025145571 | A1 | * | 5/2026 | E05B 81/34 |
| EP | 1146186 | B1 | * | 3/2005 | E05B 77/28 |
| FR | 2 775 717 | B1 | | 5/2000 | |
| FR | 2921089 | A1 | * | 3/2009 | E05B 81/16 |
| GB | 2453017 | A | * | 3/2009 | E05B 77/32 |
| GB | 2466165 | A | * | 6/2010 | E05B 81/06 |
| JP | 2009235845 | A | * | 10/2009 | E05B 77/28 |
| JP | 2021503053 | A | * | 2/2021 | E05B 81/20 |
| JP | 2021075941 | A | * | 5/2021 | E05B 81/42 |
| JP | 7537927 | B2 | * | 8/2024 | E05B 77/12 |
| WO | WO 2014/082175 | A1 | | 6/2014 | |
| WO | WO 2017/098563 | A1 | | 6/2017 | |

OTHER PUBLICATIONS

Extended European Search Report issued Feb. 18, 2025 in European Application No. 24315387 filed on Aug. 22, 2024, 6 pages.

Extended European Search Report issued Jun. 26, 2025 in European Application No. 24315595 filed on Dec. 19, 2024, 6 pages.

* cited by examiner

VEHICLE DOOR LATCH

TECHNICAL FIELD

The present invention relates to a vehicle door latch, such as a side door latch or a trunk lid latch.

BACKGROUND OF THE INVENTION

Conventional door latches have a release system which is purely mechanical. End user directly activates a mechanical opening control that moves a cable which release a door latch of the door enabling the door to open. There are usually two mechanical opening controls on the door, an inside and an outside handle. In the event of a power failure, these two mechanical opening controls can still be used.

Nowadays, door latches comprise an electrical release mechanism, also called E-release mechanism, which enables to open the door by a simple pressure on a switch or a movement in front of a detector.

These door latches can be locked and unlocked electrically. The locking function prevents the entrance into the vehicle from the outside.

In order to avoid to a user to be locked out when the user gets out of the vehicle, there is a function named override which allows mechanically unlocking the door latch from inside the vehicle, by pulling the inside handle. The door latch is unlocked when a user activates the inside handle without having to first unlock the door latch electrically. This override unlocking function can be done in one motion: the door latch is unlocked while the door latch is released in one same motion or the override unlocking function can be done in two motions: the door latch is unlocked while the inside handle is first pulled by the user, the door latch being then released while the inside handle is pulled a second time by the user.

The choice of a one-motion release or a two-motion release is generally imposed by the regulations. For example, the US regulations impose a two-motion release.

Thus, in order to adapt to a particular market, the manufacturer has to developed two different latch designs to comply with the different regulations. However, providing two latch designs doubles the engineering costs.

SUMMARY OF THE INVENTION

The purpose of the invention is to provide a solution allowing to adapt a vehicle door latch to a one-motion release or to a two-motion release with minimal adaptations and without requiring a redesign of the vehicle door latch.

To achieve this goal, the present invention refers to a vehicle door latch comprising:

a retention unit engaging with a striker of the vehicle in the closed position and releasing the striker to release the vehicle door latch in the open position, an electrical release mechanism comprising an electrical gear wheel that is configured to be moved by a releasing motor from rest position to an active position, a mechanical release mechanism comprising an inner release lever that is configured to be moved by an inner mechanical opening control from a rest position to an active position to release the retention unit in the open position and an outer mechanical lever that is configured to be moved by an outer mechanical opening control from a rest position to an active position to release the retention unit in the open position, a locking mechanism comprising a locking lever that is configured to move between an unlocked position in which the movement of the outer mechanical lever releases the retention unit of the door latch and a locked position in which the locking lever disengages the outer mechanical lever from the retention unit, an override mechanism comprising an override lever configured to move the locking lever from the locked position to the unlocked position when driven in movement over an override lever stroke by the inner release lever moving from the rest position to the active position, wherein the vehicle door latch has a first configuration wherein the override lever has a first shape wherein the override lever stroke is reached at a first position of the inner release lever wherein the override lever is configured to displace the locking lever in the unlocked position before releasing of the retention unit when the inner release lever is moved from the rest position to the active position and a second configuration wherein the override lever has a second shape wherein the override lever stroke is reached at a second position, different than the first position, of the inner release lever and wherein the override lever is configured to displace the locking lever in the unlocked position without releasing the retention unit in the open position when the inner release lever is moved from the rest position to the active position and wherein the vehicle door latch can be configured according to the first or to the second configuration by replacing the override lever.

The first configuration corresponds to a one-motion release opening and the second configuration corresponds to a two-motion release opening so that the vehicle door latch may be adapted to a local regulation requiring a one-motion release opening or a two-motion release opening just by choosing the adapted override lever.

According to an embodiment of the present invention, the override lever is articulated to the locking lever.

According to an embodiment of the present invention, the locking lever is configured to translate between the unlocked position and the locked position.

According to an embodiment of the present invention, the retention unit comprises a claw configured for rotating between a closed position wherein the claw retains the striker and an open position wherein the claw releases the striker and a pawl configured for blocking the rotation of the claw in a closed position and for authorizing the rotation of the claw in an open position.

According to an embodiment of the present invention, the vehicle door latch comprises a driver comprising a first lever configured to move the pawl in the open position, a second lever driven by the movement of the outer mechanical lever or by the movement of the inner release lever and a paddle clutch configured on one side to be moved by the locking lever in a deployed position between the first lever and the second lever of the driver such that, in the unlocked position of the locking lever, the movement of the second lever towards the active position drives the moving of the first lever to move the pawl in the open position to release the door latch and on the other side to be moved by the locking lever in a retracted position disengaging the paddle clutch from between the first lever and the second lever in the locked position of the locking lever.

According to an embodiment of the present invention, the paddle clutch is configured to be driven in movement by the locking lever in the deployed position before the second lever has been moved by the inner release lever such that the door latch is unlocked and released in the same movement of the inner release lever to provide a one-motion release opening.

According to an embodiment of the present invention, the paddle clutch is configured to be driven in movement by the locking lever in the deployed position after the second lever has been moved by the inner release lever in a blocking position in which the second lever blocks the movement of the paddle clutch towards its deployed position such that the paddle clutch subjected to an elastic return force moves in the deployed position once the inner release lever is released to provide a two-motion release opening.

According to an embodiment of the present invention, the vehicle door latch comprises a locking motor configured to move the locking lever from the unlocked position to the locked position, the locking motor being configured to be moved in the unlocked position with the movement of the locking lever from the locked position to the unlocked position.

According to an embodiment of the present invention, the vehicle door latch comprises a central opening lever configured to be moved by the electrical gear wheel between a rest position and an active position wherein the central opening lever releases the retention unit in the open position.

According to an embodiment of the present invention, the central opening lever and the inner release lever are coaxial and are configured to rotate around a common first shaft.

According to an embodiment of the present invention, the override lever is configured to move the locking lever from the locked position to the unlocked position when driven in movement over an override lever stroke by the central opening lever moving from its rest position to its active position.

According to an embodiment of the present invention, the central opening lever is configured to rotate around a first shaft and the inner mechanical lever is configured to be rotatably attached to the central opening lever via a second shaft different than the first shaft.

The present invention also refers to a vehicle door comprising an inner mechanical opening control, an outer mechanical opening control and a vehicle door latch as described above, the inner mechanical opening being mechanically linked to the inner release lever and the outer mechanical opening control being mechanically linked to the outer mechanical lever.

The invention will be better understood in view of the following description, referring to the annexed figures in which.

In these figures, identical or similar elements bear the same reference numerals. Only the elements necessary for understanding the invention are shown.

DETAILED DESCRIPTION OF THE INVENTION

The following achievements are examples. Although the specification refers to one or several embodiments, it does not imply that each reference refers to the same embodiment or that the features apply only to a single embodiment. Simple features of different embodiments can also be combined to provide other embodiments.

Figure 1:
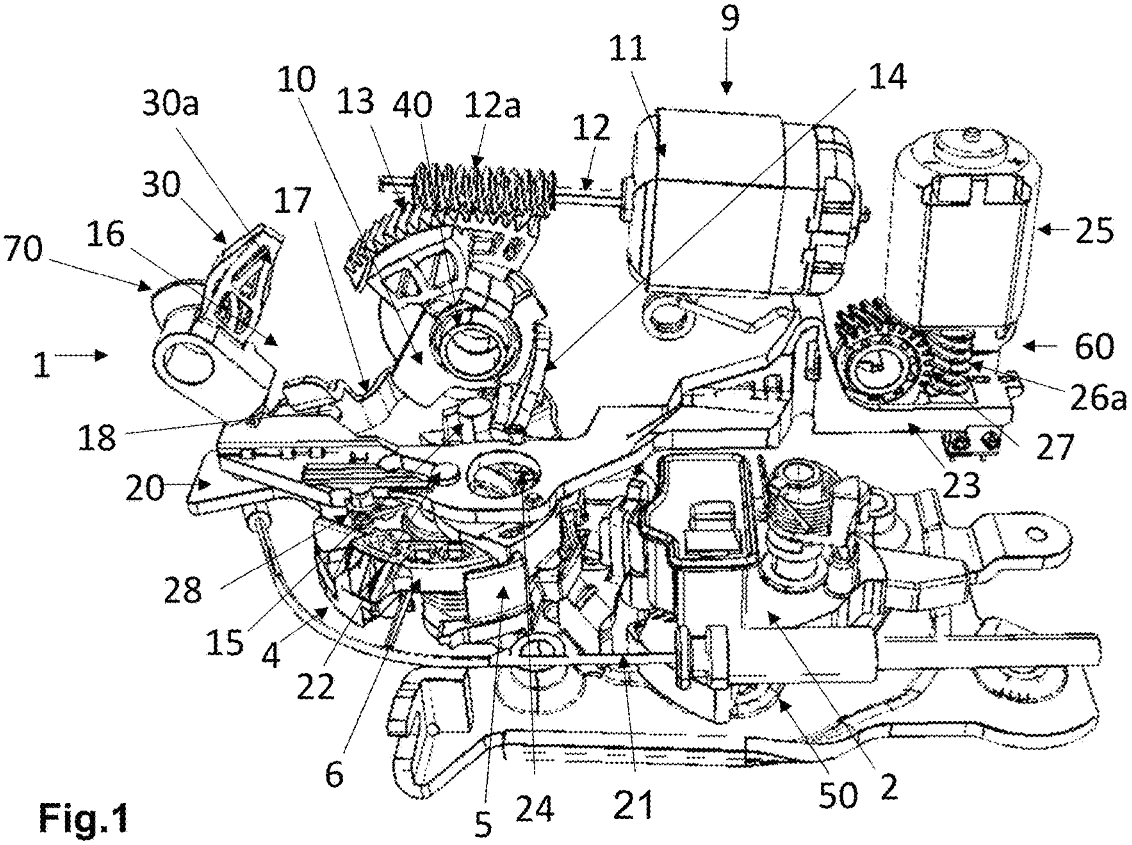
FIG. 1 is a perspective view of some element of a door latch according to an embodiment of the present invention.
Figure 2:
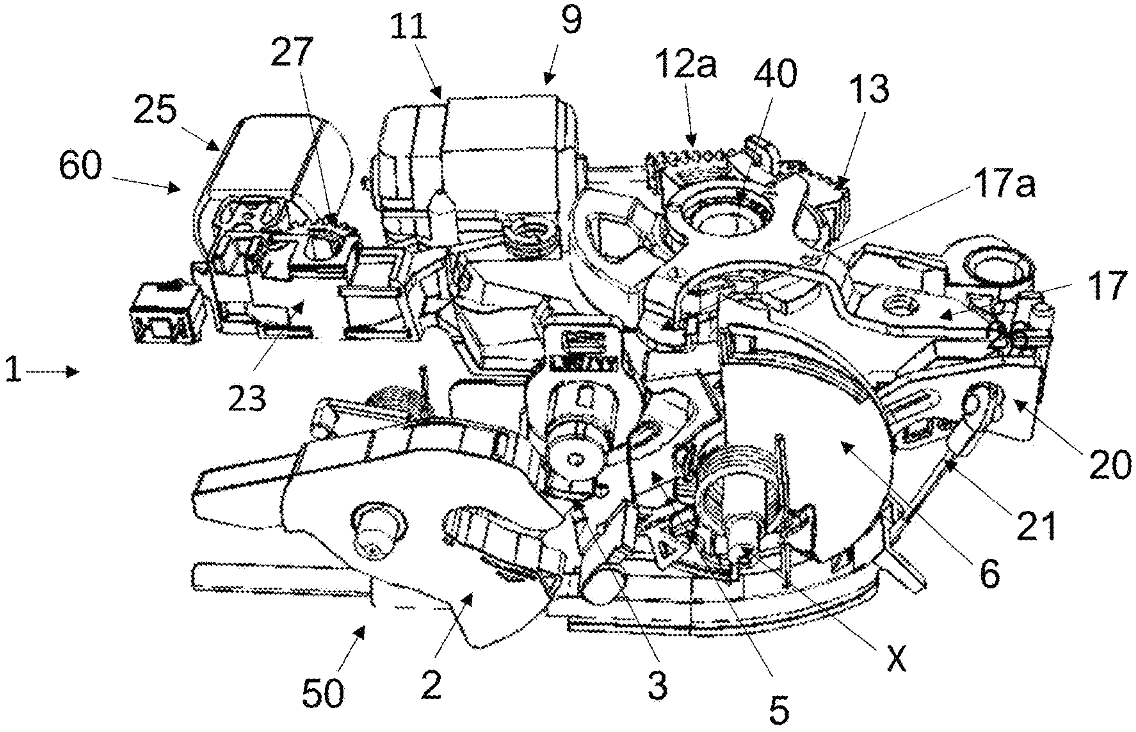
FIG. 2 is another perspective view of some elements of a door latch according to an embodiment of the present invention.

FIGS. 1 and 2 show an embodiment of a vehicle door latch 1, for closing a door of a vehicle, such as a motor vehicle, in particularly a side door or a trunk lid.

The vehicle door latch 1 comprises a retention unit 50 that comprises a claw 2 and a pawl 3 (visible in FIG. 2).

The claw 2 and the pawl 3 are both configured to pivot between an open position and a closed position. In the closed position, the retention unit 50 engages with a striker (not represented) of the vehicle, the striker being trapped in the claw 2 and the pawl 3 preventing the rotation of the claw 2. In the open position, the retention unit 50 releases the striker to release the vehicle door latch 1, the pawl 3 allowing the rotation of the claw 2 and the rotation of the claw 2 releasing the striker so the door can be opened.

The pawl 3 may be subjected to an elastic return force which pushes it toward the claw 2. The claw 2 may be subjected to an elastic return force which pushes it in the open position.

The vehicle door latch 1 also comprises an electric releasing mechanism 9. The electric releasing mechanism 9 comprises an electrical gear wheel 13 that is configured to be moved by an electric releasing motor 11 of the door latch 1, from a rest position to an active position.

More precisely here, the releasing motor 11 has an output shaft 12 with a worm 12*a* configured to mesh with the electrical gear wheel 13 so that a rotation of the output shaft 12 leads to the rotation of the electrical gear wheel 13. The electrical gear wheel 13 may comprise teeth only on a portion of circle which depends on the angular difference between the rest position and the active position of the electrical gear wheel 13.

The releasing motor 11 is activated by a control unit of the vehicle door latch 1 when a user activates an electrical (or electronical) opening control, such as a switch of a door or a key, or a movement in front of a detector. According to an embodiment, the releasing motor 11 is a reversible motor (the output shaft 12 of the release motor 11 can be rotated in a clockwise or a counterclockwise direction, for example to bring the electrical gear wheel 13 back in the rest position after a release of the striker by the vehicle door latch 1).

The vehicle door latch 1 may also comprise a central opening lever 10 which is configured to rotate around a first shaft 40 between an active position and a rest position.

The central opening lever 10 is driven in active position by the rotation of the electrical gear wheel 13 from its rest position to its active position.

According to an embodiment, the electrical gear wheel 13 and the central opening lever 10 are coaxial. They have a respective end which protrudes axially so the end of the central opening lever 10 is on the path of the end of the electrical gear wheel 13 in the direction of movement of the electrical gear wheel 13 to the active position. Thus, the electrical gear wheel 13 and the central opening lever 10 turn together when the electrical gear wheel 13 is driven to the active position.

The central opening lever 10 may be subjected to an elastic return force which pushes it in the rest position.

According to an embodiment, the movement of the central opening lever 10 from the rest position to the active position moves a first lever 5 of a driver 4 of the door latch 1 which is configured to move the pawl 3 in the open position to release the door latch 1.

The first lever 5 may be a pivoting lever. The first lever 5 is configured to move between a rest position and an active position. The first lever 5 may be subjected to an elastic return force which pushes it in rest position.

Thus, the moving of the first lever 5 can be driven by the movement of the central opening lever 10.

To rotate the first lever 5 of the driver 4, the central opening lever 10 has for example a tab 14 that cooperates with a pin 15 of the first lever 5 of the driver 4. Thus, when the central opening lever 10 rotates, the tab 14 pushes the pin 15, rotating the first lever 5 which releases the retention unit 50 in the open position.

The vehicle door latch 1 also comprises a second lever 6 of the driver 4 which may be configured to be rotated by a mechanical release mechanism 16 (which will be described in the following of the description).

The second lever 6 may be a pivoting lever. The second lever 6 is configured to move between a rest position and an active position. The second lever 6 may be subjected to an elastic return force which pushes it in the rest position.

The first lever 5 and the second lever 6 of the driver 4 may rotate around the same shaft X (coaxial).

The driver 4 also comprises a paddle clutch 24 configured to be moved between a retracted position and a deployed position.

The driver 4 also comprises a spring 28 configured to apply an elastic force to the paddle clutch 24. The spring 28 may comprise an end linked to the paddle clutch 24 and the other end linked to a locking lever 23 of a locking mechanism 60 (which will be described in the following of the description).

According to an embodiment, the paddle clutch 24 is configured to slide in a slot of the first lever 5 between the retracted position and the deployed position.

In the deployed position represented in FIG. 1, the paddle clutch 24 is deployed between the first lever 5 and the second lever 6 of the driver 4 such that the movement of the second lever 6 towards the active position drives the moving of the first lever 5 to move the pawl 3 in the open position to release the door latch 1.

Figure 3:
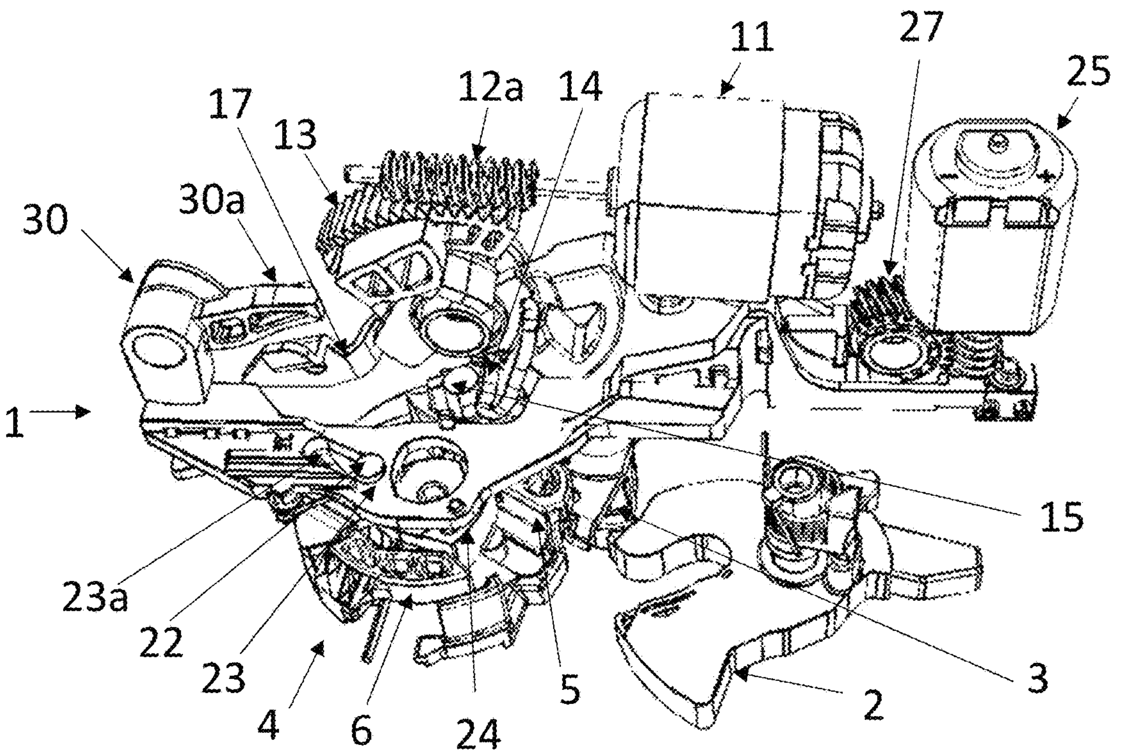
FIG. 3 is a perspective view of some elements of a door latch according to an embodiment of the present invention.

In a retracted position represented in FIG. 3, the paddle clutch 24 is disengaged from between the first lever 5 and the second lever 6 so that the movement of the second lever 6 towards the active position does not lead to a movement of the first lever 5. The door latch 1 is thus not released.

The vehicle door latch 1 also comprises a mechanical release mechanism 16. The mechanical release mechanism 16 comprises an inner mechanical lever 17 that can be moved by an inner mechanical opening control of the vehicle door (not represented), such as an inner handle, from the inside of the vehicle, from a rest position to an active position. The inner mechanical lever 17 is mechanically linked to the inner mechanical opening control for example by a cable (not represented) for example secured to the hole 18. This cable can be pulled by a user activating the inner mechanical opening control.

The inner mechanical lever 17 may be configured to rotate around the first shaft 40 as represented in FIGS. 1 and 2. In this case, the inner mechanical lever 17 and the central opening lever 10 (and the electrical gear wheel 13) are coaxial.

The inner mechanical lever 17 comprises a tab **17*a* (visible in FIG. 2) configured to displace the second lever 6 of the driver 4 towards its active position when the inner mechanical lever 17** is rotated towards its active position.

The mechanical release mechanism 16 may also comprise an outer mechanical lever 20 that can be moved by an outer mechanical opening control of the vehicle door, such as an outside handle, from the outside of the vehicle, from a rest position to an active position. The outer mechanical lever 20 is mechanically linked to the outer mechanical opening control for example by a cable 21 that can be pulled by a user activating the outer mechanical opening control.

The outer mechanical lever 20 is configured to displace the second lever 6 of the driver 4 towards its active position when the outer mechanical lever 20 is rotated towards its active position.

The vehicle door latch 1 may also comprise a locking mechanism 60 to prevent entrance into the vehicle from outside. The locking mechanism 60 comprises a locking lever 23 than can move between a locked position and an unlocked position.

The locking lever 23 may be configured to move in translation.

When the locking lever 23 moves from the locked position to the unlocked position, the locking lever 23 is configured to move the paddle clutch 24 from the retracted position to the deployed position.

According to an embodiment, to move the paddle clutch 24, the locking lever 23 is configured to drive an axial pin 22 of the paddle clutch 24 by a hole **23*a* of the locking lever 23, the locking lever 23's hole 23*a* movement driving the moving of the axial pin 22 of the paddle clutch 24 and thus, the paddle clutch 24. The hole 23*a* may have an elongated shape (to enable the translation of the locking lever 23 towards its unlocked position when the paddle clutch 24 is blocked in the retracted position by the second lever 6**).

The locking mechanism 60 may also comprise a locking motor 25 configured to move the locking lever 23 from the unlocked position to the locked position, for example upon a locking request of the user.

The locking motor 25 has here an output shaft 26 having a worm **26*a* configured to mesh with a locking gear wheel 27 so that a rotation of the output shaft 26 leads to the rotation of the locking gear wheel 27. The locking gear wheel 27 may comprise teeth only on a portion of circle which depends on the angular difference between the unlocked position and the locked position of the locking gear wheel 27 corresponding to the unlocked position and the locked position of the locking lever 23**.

As an example, the locking gear wheel 27 has a rib on one of its faces which is configured to cooperate with the locking lever 23 to move the locking lever 23 in the locked position when the locking gear wheel 27 is rotated by the worm **26*a* of the output shaft 26 of the locking motor 25 (translation to the left in FIG. 1**).

The locking motor 25 is configured to be moved from the locked position to the unlocked position by the movement of the locking lever 23 from the locked position to the unlocked position (which may be achieved by an override mechanism 70 as described in the following of the description).

According to an embodiment, the locking motor 25 is a reversible motor (the output shaft 26 of the locking motor 25 can be rotated in a clockwise or a counterclockwise direction) and is configured to move the locking lever 23 from the locked position to the unlocked position, for example upon an unlocking request of the user.

In the unlocked position, the movement of the outer mechanical lever 20 from the rest position to the active position releases the retention unit 50 of the door latch 1, enabling the door to open and in the locked position, the locking lever 23 disengages the outer mechanical 20 lever from the retention unit 50 by moving the paddle clutch 24 in the retracted position.

In the closed and locked position, the outer mechanical lever 20 cannot release the door latch 1. The second lever 6 can be driven in rotation by the outer mechanical lever 20 moving from its rest position to its active position but to face radially the paddle clutch 24 (which is in the retracted position as represented in FIG. 3), and thus without driving in rotation the paddle clutch 24, and thus, without driving in rotation the first lever 5, and without releasing the door latch 1. When the paddle clutch 24 is in the retracted position, a gap is formed between the first lever 5 and the second lever 6 so that the second lever 6 can rotates towards the active position within the gap without interaction with the first lever 5. The first lever 5 remains therefore in the rest position.

The vehicle door latch 1 may also comprise an override mechanism 70 in order to unlocked the vehicle door latch 1 when the inner mechanical lever 17 is moved from the rest position to the active position.

The override mechanism 70 comprises an override lever 30 that is configured to move the locking lever 23 from the locked position to the unlocked position. The override lever 30 is configured to be driven in movement by the inner mechanical lever 17 when moved from the rest position to the active position, intended to release the striker from the retention unit 50 to release the door latch 1.

The override lever 30 may be a pivoting lever.

In this example, the override lever 30 is articulated to the locking lever 23.

The override lever 30 remains in the unlocked position after a releasing of the door latch 1, such that the locking lever 23 remains in the unlocked position after a releasing of the door latch 1.

The override lever 30 has for example a beak 30*a* with a lower side that is configured to cooperate with an end of the inner mechanical lever 17.

According to a first embodiment of the override lever 30 represented in FIGS. 1 to 7, the override lever 30 and especially the shape of its beak 30*a*, may be conformed to move the locking lever 23 from the locked position to the unlocked position before the inner mechanical lever 17 disengages the retention unit 50 and release the door latch 1 (the paddle clutch 24 is moved in the deployed position by the locking lever 23 being moved towards the unlocked position before the second lever 6 has been moved by the inner mechanical lever 17). Thus, unlocking and releasing occur in one same motion.

Figure 4:
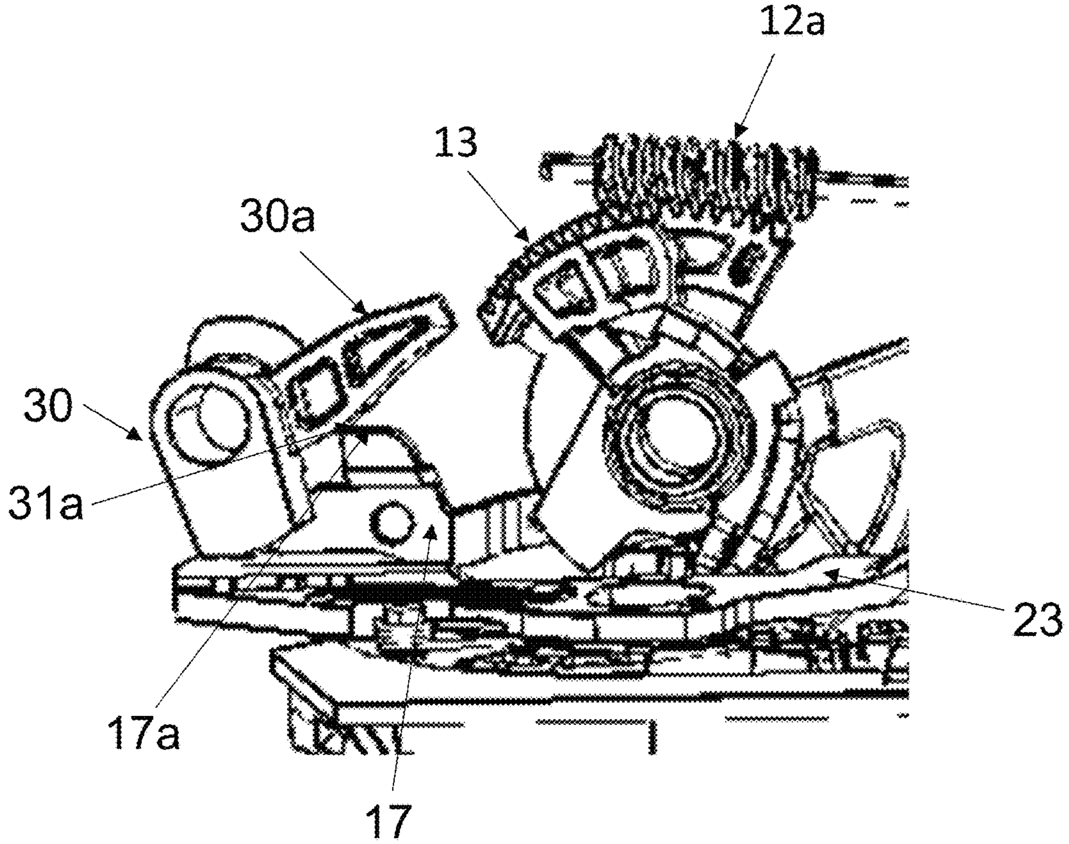
FIG. 4 represents an override lever according to a first embodiment in a first position.

In this embodiment, the lower side of the beak 30*a* has an edge 31*a* that protrudes towards the end 17*a* of the inner mechanical lever 17 so that when the inner mechanical lever 17 is moved towards its active position, the end 17*a* of the inner mechanical lever 17 comes in contact with the edge 31*a* of the beak 30*a* after a first angular displacement of the inner mechanical lever 17 as represented in FIG. 4.

Figure 5:
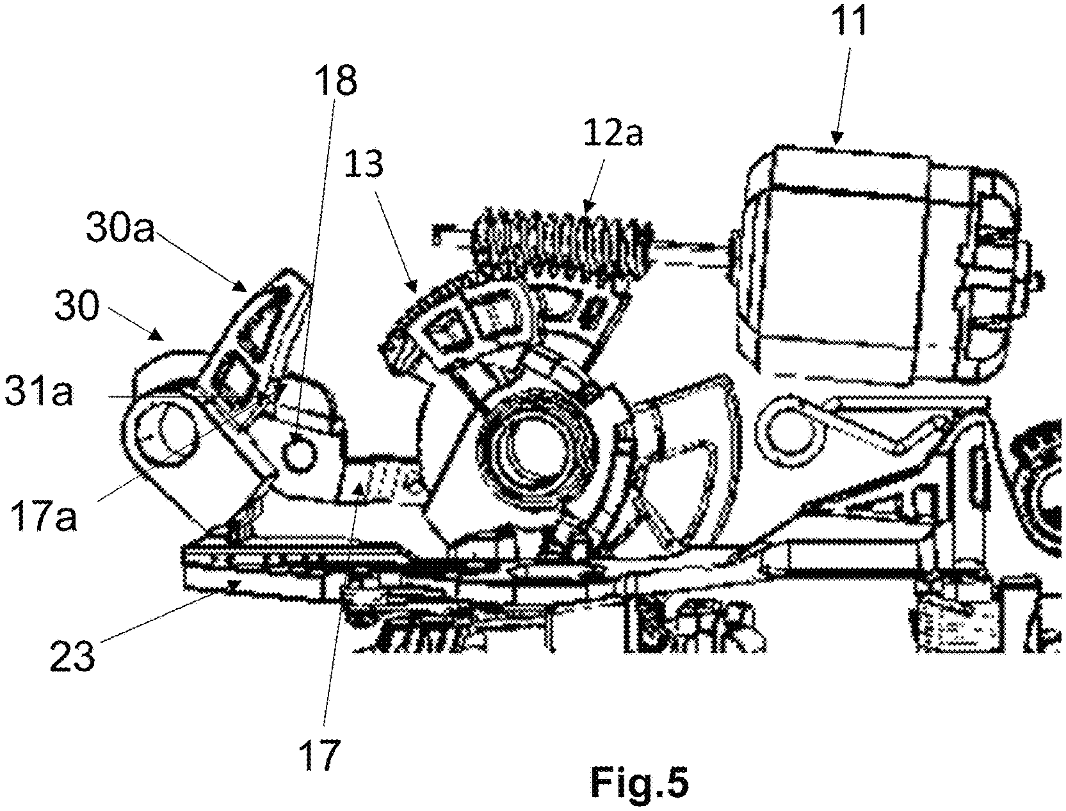
FIG. 5 represents an override lever according to the first embodiment in a second position.
Figure 6:
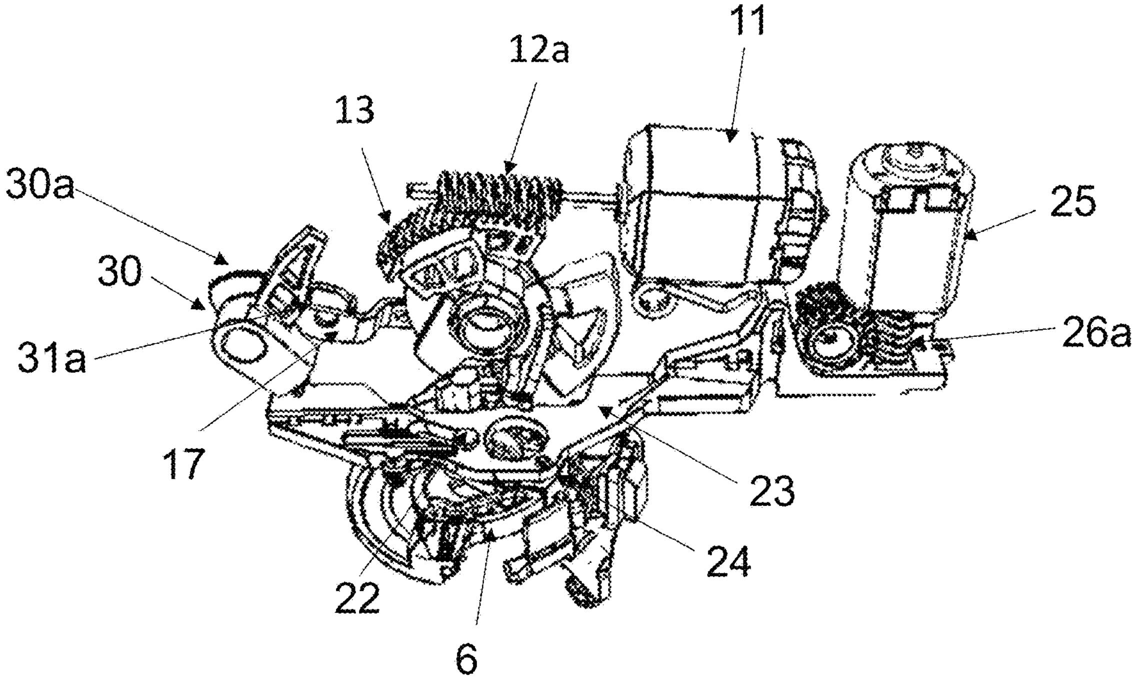
FIG. 6 represents a perspective view of some element of a door latch associated with the override lever of FIG. 5.

When the inner mechanical lever 17 is rotated of an additional angular displacement, the inner mechanical lever 17 reaches a first position corresponding to the override lever stroke wherein the override lever 30 is tilted leading to the movement of the locking lever 23 in the unlocked position as represented in FIGS. 5 and 6 (the locking lever 23 is moved toward the right side of the figure due to the tilt of the override lever 30). The displacement of the locking lever 23 towards the unlocked position leads to the displacement of the paddle clutch 24 in the deployed position.

After a further angular displacement, the rotation of the inner mechanical lever 17 leads to the rotation of the second lever 6 of the driver 4 towards its active position. Such rotation of the second lever 6 produces the rotation of the first lever 5, due to the presence of the paddle clutch 24 in the deployed position, leading to the release of the retention unit 50 in the open position.

Figure 7:
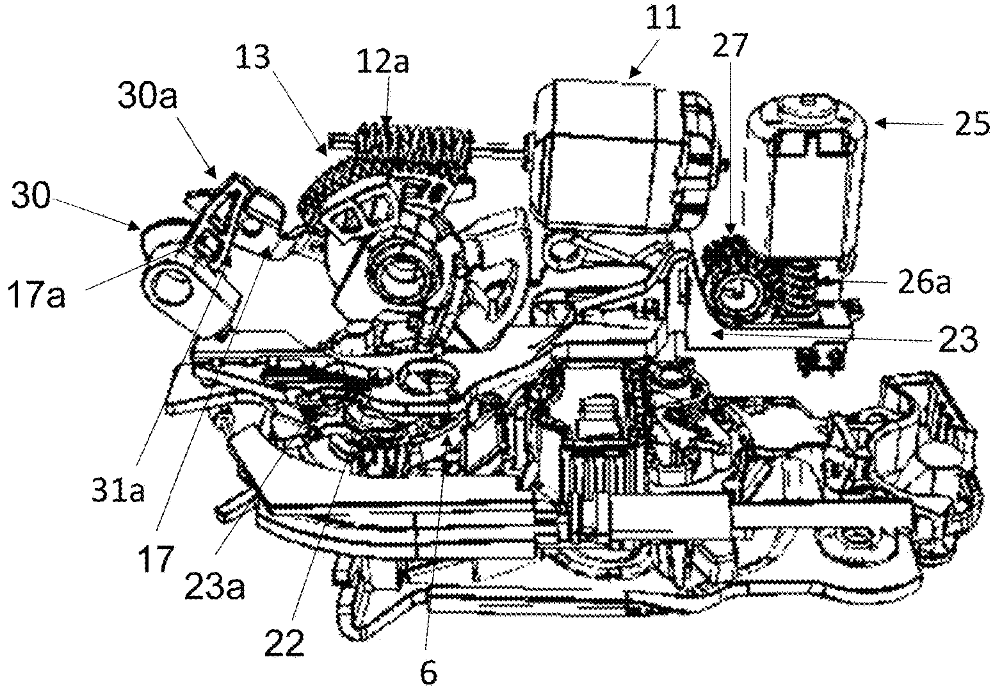
FIG. 7 represents an override lever according to the first embodiment in a third position.

Thus, when the inner mechanical lever 17 reaches its full stroke position as represented in FIG. 7, the vehicle door latch 1 is open and the striker is released.

As a consequence, the unlocking of the vehicle door latch 1 and the opening of the vehicle door latch 1 via the release of the striker are achieved in a single pull of the inner mechanical opening control.

Such configuration is called one-motion override release opening.

Figure 8:
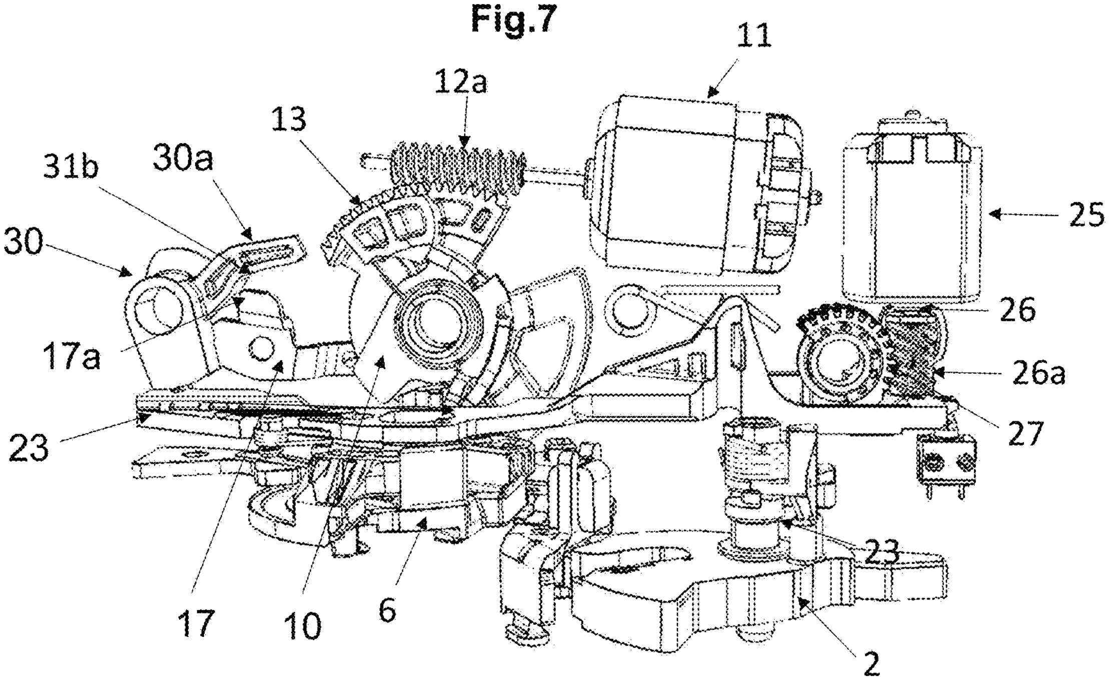
FIG. 8 represents an override lever according to a second embodiment in a first position.
Figure 9:
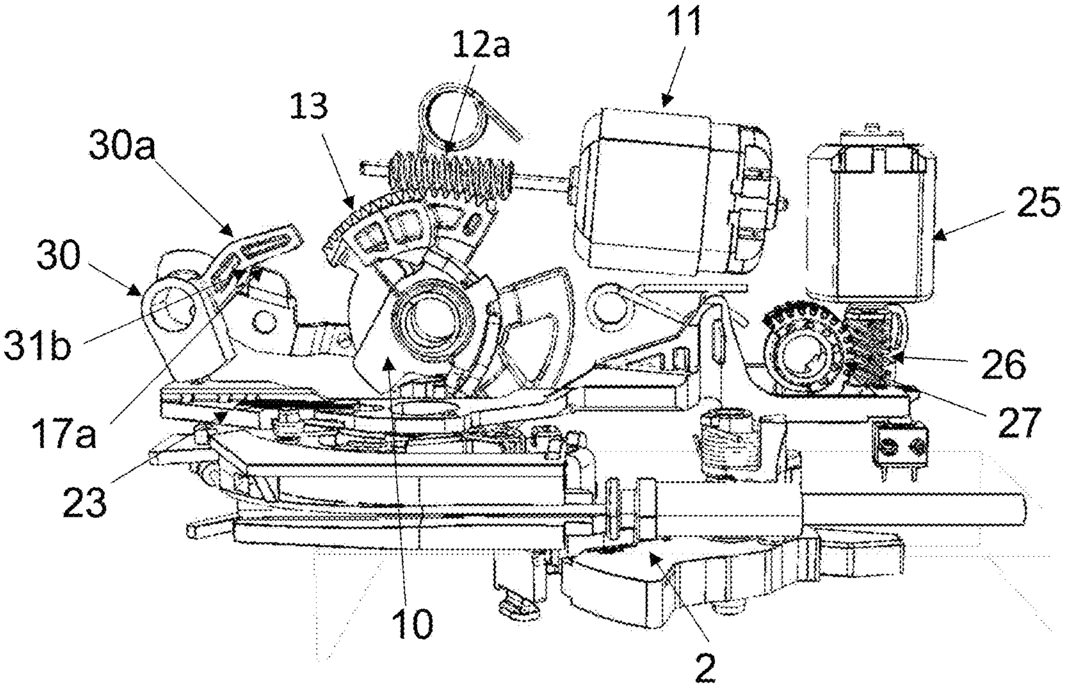
FIG. 9 represents an override lever according to the second embodiment in a second position.
Figure 10:
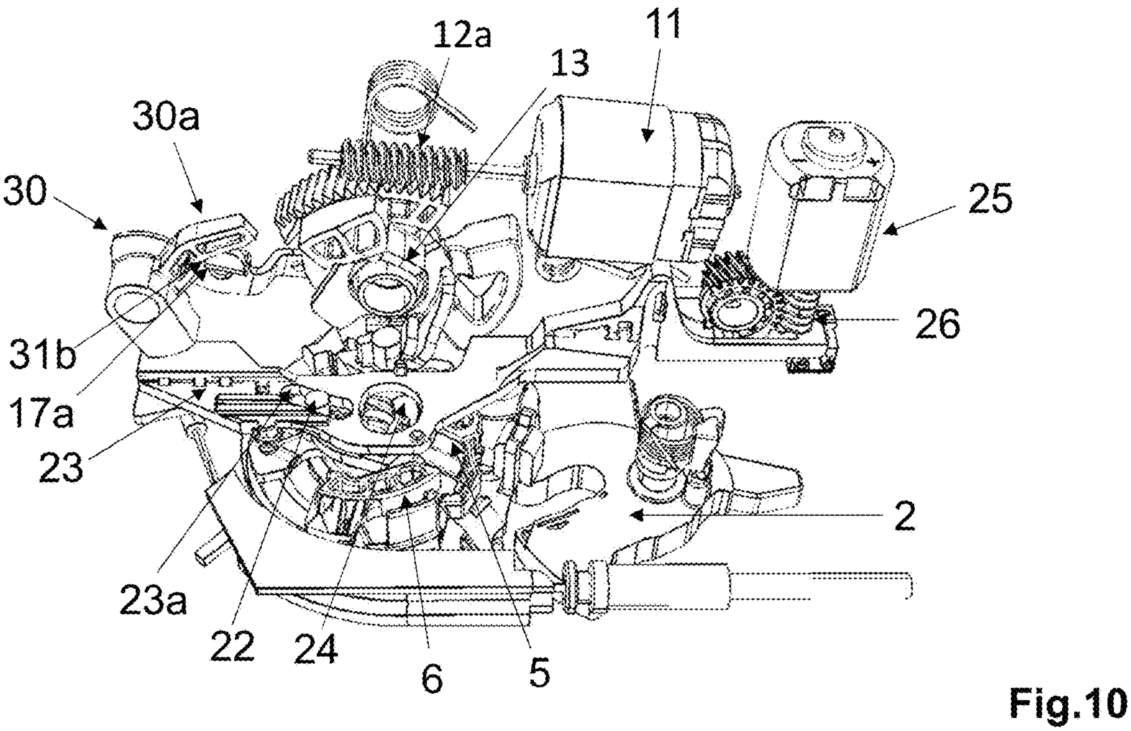
FIG. 10 represents a perspective view of some element of a door latch associated with the override lever of FIG. 9.

According to a second embodiment of the override lever 30 represented in FIG. 8 to FIG. 10, the override lever 30 and especially the shape of its beak 30*a* may be conformed to drive the moving of the paddle clutch 24 in the deployed position after the second lever 6 has been moved by the inner mechanical lever 17 in a position blocking the deployment of the paddle clutch 24.

Unlocking occurs thus at the first inner opening mechanical release of a locked door latch 1 and releasing may occur at the second inner opening mechanical release (in two motions) or by an outer opening release (subsequent to the first inner opening mechanical release) or by an electrical release (subsequent to the first inner opening mechanical release).

In this embodiment, the lower side of the beak 30*a* has a concave shape forming a hollow 31*b* so that the end 17*a* of the inner mechanical lever 17 comes in contact with the hollow 31*b* of the beak 30*a* after a second angular displacement as represented in FIG. 9. This second angular displacement is larger than the first angular displacement described previously in FIG. 4. When the inner mechanical lever 17 reaches this second angular displacement, the inner mechanical lever 17 has started to rotate the second lever 6 towards its active position. As the paddle clutch 24 is in the retracted position, the second lever 6 is rotated towards the first lever 5 in the gap corresponding to the location of the paddle clutch 24 when the paddle clutch 24 is in the deployed position.

The inner mechanical lever 17 needs to be rotated of an additional angular displacement to reach a second position (different than the first position described in FIG. 5 with the first embodiment of the override lever 30) corresponding to the override lever stroke wherein the override lever 30 is tilted leading to the movement of the locking lever 23 in the unlocked position as represented in FIG. 9 (the locking lever 23 is moved toward the right side of the figure).

As the second lever 6 has already been displaced towards to the first lever 5, the paddle clutch 24 cannot be moved in the deployed position (due to the presence of the second lever 6 at the location corresponding to the deployed position of the paddle clutch 24). Thus, the displacement of the inner mechanical lever 17 leads to the rotation of the override lever 30 (due to the interaction between the end 17*a* of the inner mechanical lever 17 and the beak 30*a* of the override lever 30 when the inner mechanical lever 17 is moved towards its active position) which moves the locking lever 23 in the unlocked position. However, the second lever 6 has already been moved to face radially the paddle clutch 24, blocking the movement of the paddle clutch 24 towards the deployed position. The paddle clutch 24 remains therefore in its retracted position. The displacement of the locking lever 23 in the unlocked position leads to the compression of the paddle clutch 24's spring 28 (due to the blocking of the paddle clutch 24 in the retracted position).

When the user releases the inner mechanical opening control, the inner mechanical lever 17 rotates back in the rest position releasing the second lever 6 in its rest position. The movement of the second lever 6 back in its rest position frees the gap between the first lever 5 and the second lever 6 so that the paddle clutch 24 is moved to its deployed position upon the action of the spring 28.

The vehicle door latch 1 is then unlocked.

The user may then release the striker from the door latch 1 by pulling a second time on the inner mechanical opening control (or by pulling the outer mechanical opening control or pushing on an electrical opening control), moving the second lever 6 of the driver 4 in rotation, which moves the first lever 5 via the movement of the paddle clutch 24 which is deployed between the first lever 5 and the second lever 6, disengaging the pawl 3 from the claw 2 to release the striker from the door latch 1.

Such configuration is called a two-motion override release opening.

According to another embodiment, the override mechanism 70 may also be applied during an electrical release of the locked door latch 1. In this case, the central opening lever is configured to displace the second lever 6 (and not the first lever 5) when the central opening lever 10 is rotated from its rest position to its active position and an end of the central opening lever 10 is configured to come in contact with the beak 30*a* of the override lever 30 to move the locking lever 23 from the locked to the unlocked position. As for the mechanical release, a one-motion override opening or a two-motion override opening may be obtained 10 depending on the choice of the override lever 30. The functioning of the other parts of the vehicle door latch 1 remain identical to the previously described embodiment.

Figure 11:
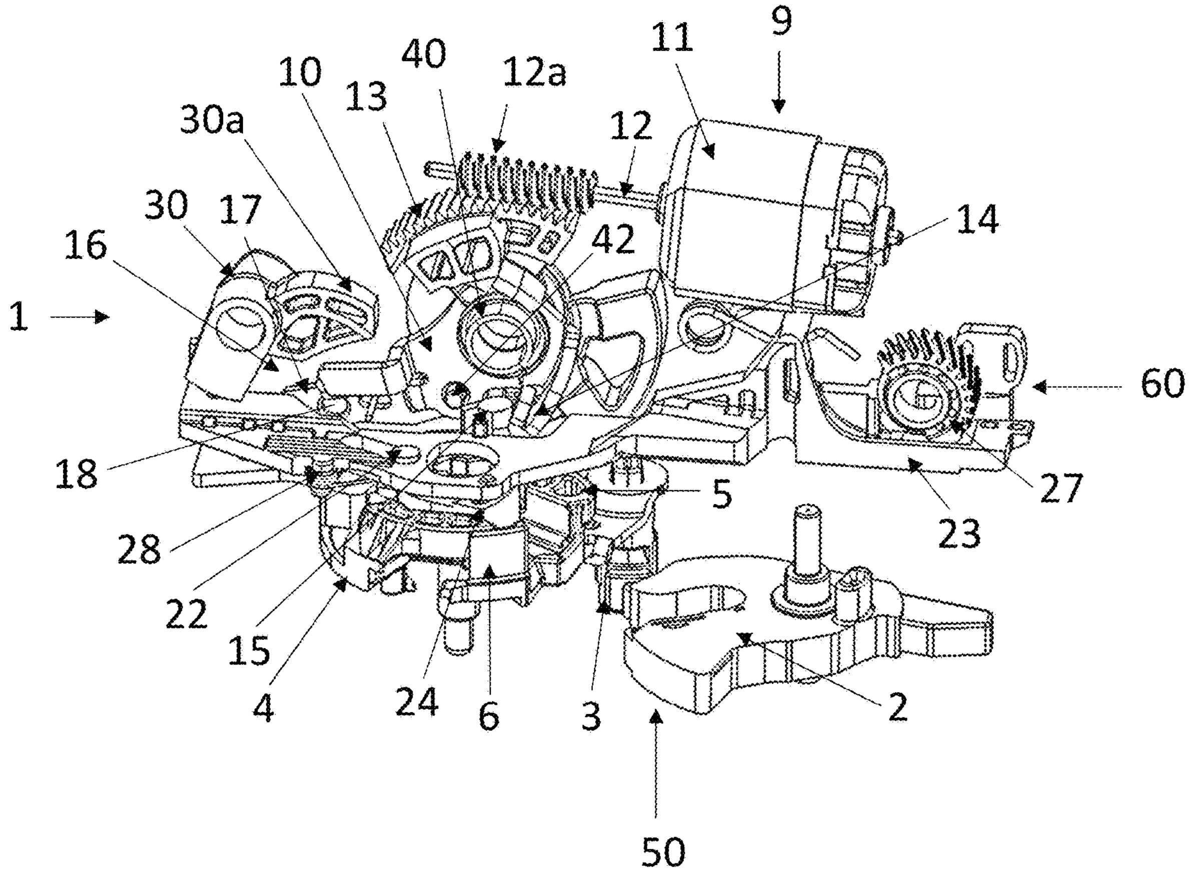
FIG. 11 represents a perspective view of some element of a door latch according to a third embodiment.

According to a further embodiment represented in FIG. 11, the central opening lever 10 is configured to displace the second lever 6 (and not the first lever 5) when the central opening lever 10 is rotated from its rest position to its active position and the inner mechanical lever 17 may be configured to be rotatably attached to the central opening lever 10 via a second shaft 42 different than the first shaft 40. In this case, the displacement of the inner mechanical lever 17 from its rest position to its active position leads to the displacement of the central opening lever 10 from its rest position to its active position and therefore to the rotation of the second lever 6. The functioning of the other parts of the vehicle door latch 1 remain identical to the previously described embodiment.

The present invention also refers to a vehicle door comprising an inner mechanical opening control, an outer mechanical opening control and a vehicle door latch 1 according to one of the previous claims as described previously, the inner mechanical opening being mechanically linked to the inner release lever 17, for example via a cable, and the outer mechanical opening control being mechanically linked to the outer mechanical lever 20, for example via a cable 21.

Thus, the configuration of vehicle door latch 1 described above enables switching from a one-motion override opening to a two-motion override opening of the vehicle door latch 1 or conversely only by switching the override lever 30. As a consequence, the manufacturer may easily adapt the vehicle door latch 1 to the local regulations by choosing the adapted override lever 30. A single vehicle door latch design may therefore be used in different countries having different regulations which reduces the overall design costs.

The invention claimed is:

1. A vehicle door latch, comprising:

a retention unit configured to engage with a striker of the vehicle in a closed position and to release the striker to release the vehicle door latch in an open position;

an electrical release mechanism comprising an electrical gear wheel that is configured to be moved by a releasing motor from rest position to an active position;

a mechanical release mechanism comprising an inner release lever that is configured to be moved by an inner mechanical opening control from a rest position to an active position to release the retention unit in the open position and an outer mechanical lever that is configured to be moved by an outer mechanical opening control from a rest position to an active position to release the retention unit in the open position;

a locking mechanism comprising a locking lever that is configured to move between an unlocked position in which the movement of the outer mechanical lever releases the retention unit of the door latch and a locked position in which the locking lever disengages the outer mechanical lever from the retention unit;

an override mechanism comprising an override lever configured to move the locking lever from the locked position to the unlocked position when driven in movement over an override lever stroke by the inner release lever moving from the rest position to the active position, wherein the vehicle door latch has a first configuration wherein the override lever has a first shape wherein the override lever stroke is reached at a first position of the inner release lever wherein the override lever is configured to displace the locking lever in the unlocked position before the releasing of the retention unit when the inner release lever is moved from the rest position to the active position and a second configuration wherein the override lever has a second shape wherein the override lever stroke is reached at a second position, different than the first position, of the inner release lever and wherein the override lever is configured to displace the locking lever in the unlocked position without releasing the retention unit) in the open position when the inner release lever is moved from the rest position to the active position, and wherein the vehicle door latch can be configured according to the first or to the second configuration by replacing the override lever.

2. The vehicle door latch in accordance with claim 1, wherein the override lever is articulated to the locking lever.

3. The vehicle door latch in accordance with claim 1, wherein the locking lever is configured to translate between the unlocked position and the locked position.

4. The vehicle door latch in accordance with claim 1, wherein the retention unit comprises a claw configured to rotate between a closed position wherein the claw retains the striker and an open position wherein the claw releases the striker, and a pawl configured to block the rotation of the claw in a closed position and to authorize the rotation of the claw in an open position.

5. The vehicle door latch in accordance with claim 4, wherein the vehicle door latch comprises a driver comprising a first lever configured to move the pawl in the open position, a second lever driven by the movement of the outer mechanical lever or by the movement of the inner release lever, and a paddle clutch configured on one side to be moved by the locking lever in a deployed position between the first lever and the second lever of the driver such that, in the unlocked position of the locking lever, the movement of the second lever towards the active position drives the moving of the first lever to move the pawl in the open position to release the door latch and on the other side to be moved by the locking lever in a retracted position disengaging the paddle clutch from between the first lever and the second lever in the locked position of the locking lever.

6. The vehicle door latch in accordance with claim 5, wherein the paddle clutch is configured to be driven in movement by the locking lever in the deployed position before the second lever has been moved by the inner release lever such that the door latch is unlocked and released in the same movement of the inner release lever to provide a one-motion release opening.

7. The vehicle door latch in accordance with claim 5, wherein the paddle clutch is configured to be driven in movement by the locking lever in the deployed position after the second lever has been moved by the inner release lever in a blocking position in which the second lever blocks the movement of the paddle clutch towards its deployed position such that the paddle clutch subjected to an elastic return force moves in the deployed position once the inner release lever is released to provide a two-motion release opening.

8. The vehicle door latch in accordance with claim 1, further comprising a locking motor configured to move the locking lever from the unlocked position to the locked position, the locking motor being configured to be moved in the unlocked position with the movement of the locking lever from the locked position to the unlocked position.

9. The vehicle door latch in accordance with claim 1, further comprising a central opening lever configured to be moved by the electrical gear wheel between a rest position and an active position wherein the central opening lever releases the retention unit in the open position.

10. The vehicle door latch in accordance with claim 9, wherein the central opening lever and the inner release lever are coaxial and are configured to rotate around a common first shaft.

11. The vehicle door latch in accordance with claim 10, wherein the override lever is configured to move the locking lever from the locked position to the unlocked position when driven in movement over an override lever stroke by the central opening lever moving from its rest position to its active position.

12. The vehicle door latch in accordance with claim 9, wherein the central opening lever is configured to rotate around a first shaft and the inner mechanical lever is configured to be rotatably attached to the central opening lever via a second shaft different than the first shaft.

13. A vehicle door, comprising:

an inner mechanical opening control;

an outer mechanical opening control the vehicle door latch in accordance with claim 1, wherein the inner mechanical opening is mechanically linked to the inner release lever and the outer mechanical opening control is mechanically linked to the outer mechanical lever.

* * * * *